(12) United States Patent
Hoch et al.

(10) Patent No.: US 8,118,216 B2
(45) Date of Patent: Feb. 21, 2012

(54) METHOD AND SYSTEM FOR DISCOVERING SIGNIFICANT SUBSETS IN COLLECTION OF DOCUMENTS

(75) Inventors: Robert Hoch, Wilton, CT (US); Tayo Ibikunle, Wynnewood, PA (US); Ehud Kamin, Koranit (IL); William A. Liberis, Stamford, CT (US); Tomasz J. Nowicki, Briarcliff Manor, NY (US); Michael J. Reilly, Malahide (IE); Howard E. Sachar, Mount Kisco, NY (US); Charles P. Tresser, New York, NY (US); Eugene Walach, Haifa (IL)

(73) Assignees: JP Morgan Chase Bank, New York, NY (US); International Business Machines Corporation, Armonk, NY (US)

( * ) Notice: Subject to any disclaimer, the term of this patent is extended or adjusted under 35 U.S.C. 154(b) by 226 days.

(21) Appl. No.: 11/927,977

(22) Filed: Oct. 30, 2007

(65) Prior Publication Data
US 2008/0061136 A1 Mar. 13, 2008

Related U.S. Application Data

(63) Continuation of application No. 11/126,211, filed on May 11, 2005, now Pat. No. 7,360,686.

(51) Int. Cl.
*G06Q 40/00* (2006.01)
(52) U.S. Cl. ........ 235/379; 235/380; 382/135; 382/137; 705/45
(58) Field of Classification Search .................. 235/379, 235/380; 382/137, 139
See application file for complete search history.

(56) References Cited

U.S. PATENT DOCUMENTS

| | | | |
|---|---|---|---|
| 3,653,480 | A | 4/1972 | Yamamoto et al. |
| 4,321,672 | A | 3/1982 | Braun et al. |
| 4,386,432 | A | 5/1983 | Nakamura et al. |
| 4,396,985 | A | 8/1983 | Ohara |
| 4,542,829 | A | 9/1985 | Emery et al. |
| 4,617,457 | A | 10/1986 | Granzow et al. |
| 4,672,377 | A | 6/1987 | Murphy et al. |
| 4,700,055 | A | 10/1987 | Kashkashian, Jr. |
| 4,797,913 | A | 1/1989 | Kaplan et al. |
| 4,799,156 | A | 1/1989 | Shavit et al. |
| 4,812,628 | A | 3/1989 | Boston et al. |
| 4,823,264 | A | 4/1989 | Deming |
| 4,988,849 | A | 1/1991 | Sasaki et al. |

(Continued)

FOREIGN PATENT DOCUMENTS

EP 0 099 999 2/1984

(Continued)

OTHER PUBLICATIONS

T.M. Ha, et al., "Image Processing for Document Image Analysis", Chapter 1, pp. 1-47, Handbook of Character Recognition and Document Image Analysis, World Scientific, Singapore, 1997.

(Continued)

*Primary Examiner* — Daniel Hess
(74) *Attorney, Agent, or Firm* — McGinn Intellectual Property Law Group, PLLC

(57) ABSTRACT

A method (and system) of discovering a significant subset in a collection of documents, includes identifying a set of documents from a plurality of documents based on a likelihood that documents in the set of documents carries an instance of information that is characteristic to the documents in the set of documents.

16 Claims, 12 Drawing Sheets

U.S. PATENT DOCUMENTS

| | | |
|---|---|---|
| 5,023,904 A | 6/1991 | Kaplan et al. |
| 5,053,607 A | 10/1991 | Carlson et al. |
| 5,054,096 A | 10/1991 | Beizer |
| 5,111,395 A | 5/1992 | Smith et al. |
| 5,122,950 A | 6/1992 | Benton et al. |
| 5,175,682 A | 12/1992 | Higashiyama et al. |
| 5,198,975 A | 3/1993 | Baker et al. |
| 5,225,978 A | 7/1993 | Petersen et al. |
| 5,237,159 A | 8/1993 | Stephens et al. |
| 5,237,620 A | 8/1993 | Deaton et al. |
| 5,283,829 A | 2/1994 | Anderson |
| 5,287,269 A | 2/1994 | Dorrough et al. |
| 5,311,594 A | 5/1994 | Penzias |
| 5,321,238 A | 6/1994 | Kamata et al. |
| 5,326,959 A | 7/1994 | Perazza |
| 5,336,870 A | 8/1994 | Hughes et al. |
| 5,350,906 A | 9/1994 | Brody et al. |
| 5,367,581 A | 11/1994 | Abel et al. |
| 5,373,550 A | 12/1994 | Campbell et al. |
| 5,396,417 A | 3/1995 | Burks et al. |
| 5,402,474 A | 3/1995 | Miller et al. |
| 5,412,190 A | 5/1995 | Josephson et al. |
| 5,420,405 A | 5/1995 | Chasek |
| 5,424,938 A | 6/1995 | Wagner et al. |
| 5,430,644 A | 7/1995 | Deaton et al. |
| 5,444,794 A | 8/1995 | Uhland, Sr. |
| 5,444,841 A | 8/1995 | Glaser et al. |
| 5,446,740 A | 8/1995 | Yien et al. |
| 5,448,471 A | 9/1995 | Deaton et al. |
| 5,465,206 A | 11/1995 | Hilt et al. |
| 5,479,494 A | 12/1995 | Clitherow |
| 5,479,532 A | 12/1995 | Abel et al. |
| 5,483,445 A | 1/1996 | Pickering |
| 5,484,988 A | 1/1996 | Hills et al. |
| 5,504,677 A | 4/1996 | Pollin |
| 5,506,691 A | 4/1996 | Bednar et al. |
| 5,513,250 A | 4/1996 | McAllister |
| 5,537,314 A | 7/1996 | Kanter |
| 5,544,040 A | 8/1996 | Gerbaulet |
| 5,550,734 A | 8/1996 | Tarter et al. |
| 5,551,021 A | 8/1996 | Harada et al. |
| 5,568,489 A | 10/1996 | Yien et al. |
| 5,583,759 A | 12/1996 | Geer |
| 5,590,196 A | 12/1996 | Moreau |
| 5,592,377 A | 1/1997 | Lipkin |
| 5,592,378 A | 1/1997 | Cameron et al. |
| 5,621,201 A | 4/1997 | Langhans et al. |
| 5,640,577 A | 6/1997 | Scharmer |
| 5,649,117 A | 7/1997 | Landry |
| 5,652,786 A | 7/1997 | Rogers |
| 5,659,165 A | 8/1997 | Jennings et al. |
| 5,659,469 A | 8/1997 | Deaton et al. |
| 5,677,955 A | 10/1997 | Doggett et al. |
| 5,679,938 A | 10/1997 | Templeton et al. |
| 5,679,940 A | 10/1997 | Templeton et al. |
| 5,692,132 A | 11/1997 | Hogan |
| 5,699,528 A | 12/1997 | Hogan |
| 5,703,344 A | 12/1997 | Bezy et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne et al. |
| 5,715,399 A | 2/1998 | Bezos |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Riach et al. |
| 5,770,843 A | 6/1998 | Rose et al. |
| 5,793,861 A | 8/1998 | Haigh |
| 5,794,221 A | 8/1998 | Egendorf |
| 5,802,498 A | 9/1998 | Comesanas |
| 5,819,236 A | 10/1998 | Josephson |
| 5,823,463 A | 10/1998 | Fissmann et al. |
| 5,826,241 A | 10/1998 | Stein et al. |
| 5,826,245 A | 10/1998 | Sandberg-Diment |
| 5,832,460 A | 11/1998 | Bednar et al. |
| 5,832,463 A | 11/1998 | Funk |
| 5,832,464 A | 11/1998 | Houvener et al. |
| 5,835,603 A | 11/1998 | Coutts et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,725 A | 2/1999 | Bellinger et al. |
| 5,873,072 A | 2/1999 | Kight et al. |
| 5,883,810 A | 3/1999 | Franklin et al. |
| 5,884,288 A | 3/1999 | Chang et al. |
| 5,897,625 A | 4/1999 | Gustin et al. |
| 5,903,881 A | 5/1999 | Schrader et al. |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks et al. |
| 5,945,653 A | 8/1999 | Walker et al. |
| 5,966,698 A | 10/1999 | Pollin |
| 5,978,780 A | 11/1999 | Watson |
| 6,003,762 A | 12/1999 | Hayashida |
| 6,006,208 A | 12/1999 | Forst et al. |
| 6,009,442 A | 12/1999 | Chen et al. |
| 6,032,137 A | 2/2000 | Ballard |
| 6,038,553 A | 3/2000 | Hyde, Jr. |
| 6,041,315 A | 3/2000 | Pollin |
| 6,065,675 A | 5/2000 | Teicher |
| 6,105,011 A | 8/2000 | Morrison, Jr. |
| 6,111,858 A | 8/2000 | Greaves et al. |
| 6,129,273 A | 10/2000 | Shah |
| 6,149,056 A | 11/2000 | Stinson et al. |
| 6,301,379 B1 | 10/2001 | Thompson et al. |
| 6,338,049 B1 | 1/2002 | Walker et al. |
| 6,339,766 B1 | 1/2002 | Gephart |
| 6,490,568 B1 | 12/2002 | O'Mara et al. |
| 6,588,571 B1 | 7/2003 | Baudat |
| 6,621,919 B2 * | 9/2003 | Mennie et al. ............... 382/135 |
| 6,880,692 B1 * | 4/2005 | Mazur et al. ............... 194/207 |
| 2001/0047334 A1 | 11/2001 | Nappe et al. |
| 2001/0047489 A1 | 11/2001 | Ito et al. |
| 2002/0013728 A1 | 1/2002 | Wilkman |
| 2002/0038363 A1 | 3/2002 | MacLean |
| 2002/0052842 A1 | 5/2002 | Schuba et al. |
| 2002/0062285 A1 | 5/2002 | Amann et al. |
| 2002/0077978 A1 | 6/2002 | O'Leary et al. |
| 2002/0087468 A1 | 7/2002 | Ganesan et al. |
| 2002/0091635 A1 | 7/2002 | Dilip et al. |
| 2003/0208441 A1 | 11/2003 | Poplawski et al. |
| 2004/0078328 A1 | 4/2004 | Talbert et al. |
| 2004/0162775 A1 | 8/2004 | Winklevoss et al. |
| 2004/0213448 A1 * | 10/2004 | Jou et al. ............... 382/135 |
| 2004/0247169 A1 | 12/2004 | Ross et al. |
| 2005/0108167 A1 * | 5/2005 | Cordery et al. ............... 705/45 |

FOREIGN PATENT DOCUMENTS

| | | |
|---|---|---|
| WO | 91/16691 | 10/1991 |
| WO | 93/08545 | 4/1993 |
| WO | 96/08783 | 3/1996 |
| WO | 02/063432 | 8/2002 |

OTHER PUBLICATIONS

U. Kressel, et al., "Pattern Classification Techniques Based on Function Approximation", Chapter 2, pp. 49-78, Handbook of Character Recognition and Document Image Analysis, World Scientific, Singapore, 1997.

L. Lam, et al., "Combination of Multiple Classifier Decision for Optical Character Recognition for Optical Character Recognition", Chapter 3, pp. 79-101, Handbook of Character Recognition and Document Image Analysis, World Scientific, Singapore 1997.

A. Agarwal, et al., "Bank Check Analysis and Recognition by Computer", Chapter 24, pp. 623-651.

S. Kelland, et al., "A Comparison of Research and Production Architectures for Check Reading Systems", Fifth International Conference on Document Analysis and Recognition, pp. 99-102, Bangalore, India, 1999.

L. Rabiner, et al., "Fundamentals of Speech Recognition", Prentice Hall, 1993.

PCT International Search Report, PCT Application No. PCT/US01/42979, Credit/Debit/ATMs Section, Nov. 8, 2001.

Valerie Block, "Blockbuster Running Test of a Stored Value Card", The American Banker, Sep. 1, 1995.

Melinda Norris, "First Data Unit Develops Blockbuster Cash Card", Business Section, p. 16, Omaha World Herald, Jan. 19, 1996.

"First Data Markets Stored-Value Cards", Cards International, p. 5, Jan. 30, 1996.

Rachel-Emma Silverman, "A New Strategy for Giving Away Your Money", pp. D1-D2, Oct. 6, 2004.

"Cardflash Daily Payment Cards New", CardWeb.com Inc., Frederick, Maryland, Sep. 23, 2004.

"The Stars in the Sky Flicker, and Fund Stars Do the Same".

"CESNaBANCO introduces stored value card technology; Blockbuster Video is first merchant partner", Business Wire, Jan. 15, 1996, Omaha, Nebraska.

Priya Malhorta, "Clearing House Enumerates e-Payment Ills", American Banker, vol. 167, No. 154, Aug. 13, 2002.

Newsbyte, Feb. 15, 1995, 2 pages.

"Wells Fargo Rolls Out Nationwide Lockbox Check Conversion", PR Newswire, Financial News Section, Apr. 22, 2003.

L. Lam, et al., "Combination of Multiple Classifier Decision for Optical Character Recognition for Optical Character Recognition", Chapter 3, pp. 79-101, Handbook of Character Recognition and Document Image Analysis, World Scientific, Singapore 1997.

* cited by examiner

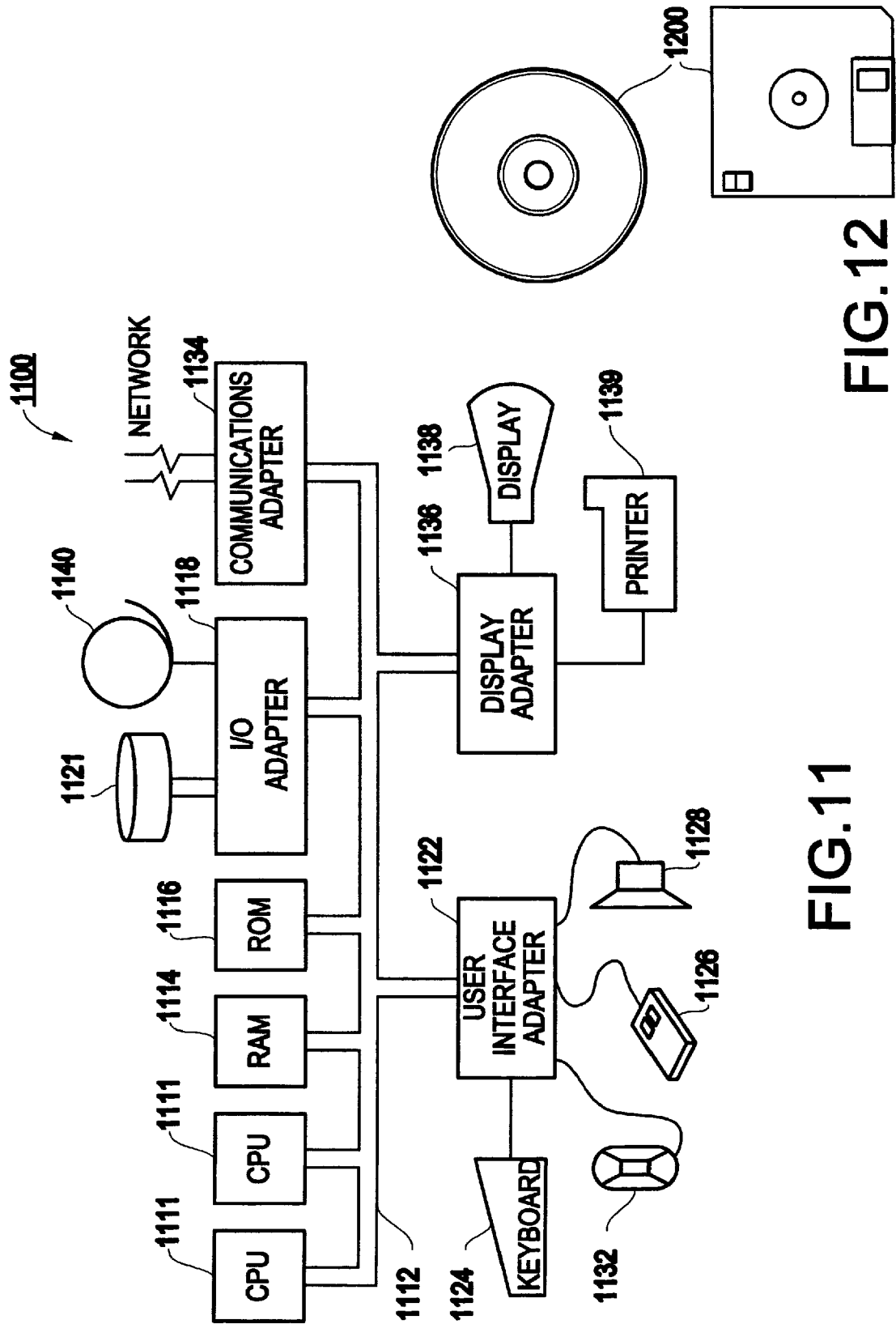

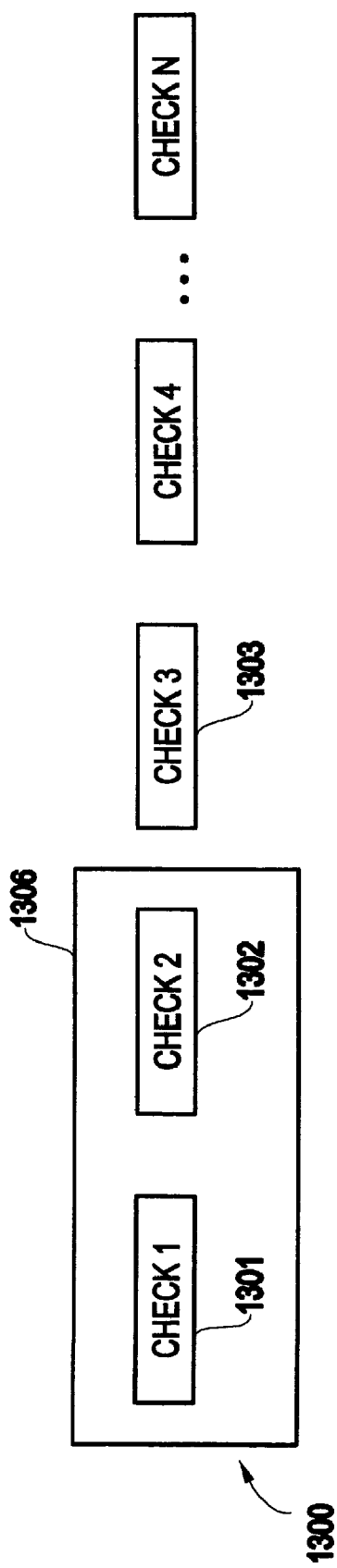
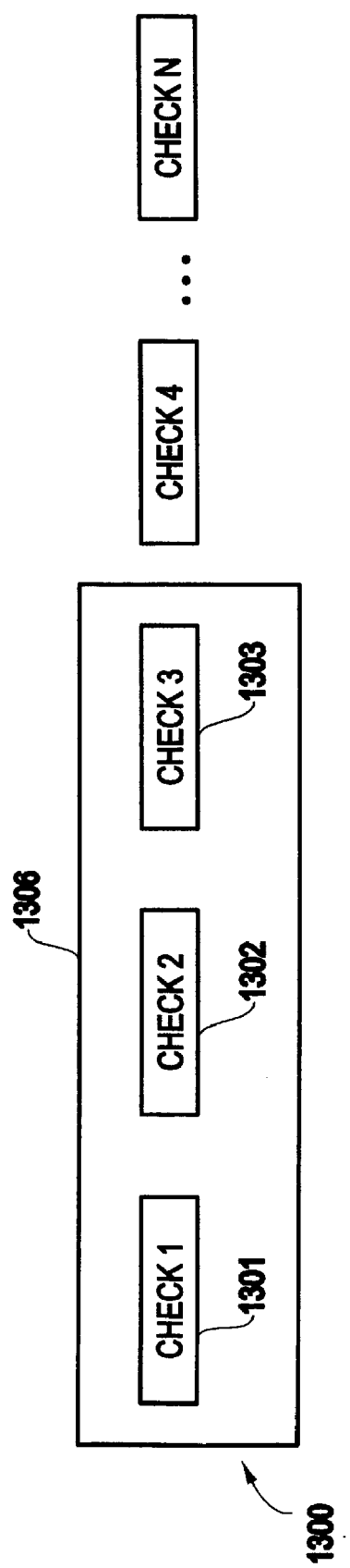

METHOD AND SYSTEM FOR DISCOVERING SIGNIFICANT SUBSETS IN COLLECTION OF DOCUMENTS

The present application is a Continuation Application of U.S. patent application Ser. No. 11/126,211 filed on May 11, 2005 now U.S. Pat. No. 7,360,686.

BACKGROUND OF THE INVENTION

1. Field of the Invention

The present invention generally relates to a method and system of automated extraction of information from human readable sources, and more particularly to a method and system of discovering and delineating within a collection of documents generated/customized by unknown sources subsets that share common semantic features when the common semantic features are unknown prior to examining the documents. In an exemplary embodiment, the present invention will find within a plurality of documents such subsets in cases where the documents may partially or fully include human created analog indicia (e.g., handwritten, spoken, etc.) and where standard automatic recognition techniques are inadequate.

2. Description of the Related Art

Typically, a check is made by a payer (Pa(i)) to a payee, or a recipient (Re(j)). The check is made on an account that the payer has at a bank (Ban(Pa(i))). This means that the check is drawn on the bank (Ban(Pa(i))).

Checks that arrive at a business as the recipient thereon, are usually stamped on the back of the check by that business (Bus(k)(=Re(j))). The business will then deposit these checks at its bank (Ban(Bus(k))). It is possible that the business may use several different banks, so that the checks may be deposited in several different banks.

The business' bank (Ban(Bus(k))) regularly (e.g., in most countries, every working/business day) bundles together all of the checks that it receives and that are drawn on each individual bank. Then, the business' bank (Ban(Bus(k))) sends to the payer's bank (Ban(Pa(i))) all of the checks drawn from accounts on that bank. Therefore, the payer's bank receives the checks from a particular payee in batches or strings of checks.

The payer's bank (Ban(Pa(i))), may want to capture some information from these checks. Such data capture is difficult to perform quickly because most data added by payers on checks, such as payee's name, date, amount, comments, etc., is handwritten. Generally, it is difficult for a bank to capture handwritten information automatically from a check. Some payers use stamps to add payee data to a check. However, even stamps are often obscured by superimposed stamps or writings, and placed in ways, which are often not systematic.

Most banks convert received checks from their analog form to a digital form, in particular to allow data to flow and to be stored, retrieved, etc., using electronic means of storage, search, communication, and other aspects of check handling. The information that the payer's bank or other entities may wish to obtain can be extracted from the checks, either when they are handled in paper form, or when they are transformed into an image.

Checks are very familiar objects to most adults in modernized countries like the United States where they are still commonly used. The following description will be directed to checks from the United States. However, most if not all of what is described applies equally to checks from most countries. FIG. 1 illustrates a front view of a standard American check, and FIG. 2 illustrates a rear view of a standard American check. There are several distinctive fields on the check, which are described below.

Referring to FIG. 1, the MICR line (X) 101 is a relatively long number usually located on the bottom left of the front of the check. The MICR line 101 includes the branch number, the account number, and the check number for that account. The check number 102 itself is repeated, usually on the upper right corner of the front of the check 100. The name and address 103 of the account owner (e.g., an individual or a company) is usually on the upper left of the front of the check 100. The name and address field 103 may also include a telephone number, and/or some other identifying numbers in the case of a corporation.

The check 100 also includes a number of different fields for writing or stamping additional information that is particular to the check being written. The fields for inputting information include the date that the check is written 104, the payee's name (individual or business) 105, the numerical amount (or courtesy amount) 106, and the written amount (or official amount) 107. Additionally, the front of the check 100 includes a signature field 108 where the payer signs the check 100. Also, the front of the check 100 includes a memo line 111, which is a field for the payer to write what the check is being used in payment for or to include any other pertinent information, such as an account number.

The front of the check 100 also provides information describing the payer's bank. Specifically, the front of the check 100 includes the name and address of the bank 109 and an identifying logo 110 of the bank. The check 100 may also include a notice 112 that the check is equipped with counterfeiting adverse features. Specific details of the features will be defined on the back of the check.

Referring to FIG. 2, the back of the check includes an area for the payee to endorse the check 113. Also, the back of the check may include the specific details of the counterfeiting adverse features 114, as indicated on the front of the check (see 112), which includes instructions to reject the check if some of these features are compromised.

While most of the world is moving away from checks (although at a rather slow pace; about 4% decrease per year in England, for instance), the use of checks in the United States remains extremely high. In fact, even in countries where overall check traffic has been significantly decreased, there are businesses, which still handle an increasing number of checks. For example, in the United States in 1993, checks represented 80% of the non-cash transaction volume for only 13% of the transaction value, with an average value per transaction of $1,150. Hence, while the use of checks has been declining in some countries, it is still increasing in some.

Checks have been chosen as one example of documents that carry information that can be used for purposes other than the intended use of the document carrying the information. Some of the potentially useful information written on a check (taken as an example of a document) is handwritten by a person whose handwriting is unknown, (or poorly printed) in the sense that automated recognition has not been trained on it. The typical handwriting on a check is so badly written that current image recognition machines cannot decipher the content, nor is it expected that the next few generations of machines will be able to decipher the content.

There is a need for a process that allows a bank, or other document handling institution, to discover significant subsets of documents in a collection of documents where the common distinguishing features shared by the documents in the significant subset of documents is not known prior to discovering the significant subset. For example, there is a need for a process that will allow a bank to find a large number of checks written to a specific payee where the payee, and any information regarding the payee, is not known prior to discovering the subset of checks written to the payee. Currently, there are no methods or systems in existence, which allow a document handler to discover such subsets of documents in a collection of documents.

SUMMARY OF THE INVENTION

In view of the foregoing and other exemplary problems, drawbacks, and disadvantages of the conventional methods and structures, an exemplary feature of the present invention is to provide a method and system in which a party (e.g., a bank in an exemplary non-limiting embodiment) may discover and delineate within a collection of documents generated/customized by unknown sources subsets that share common semantic features when the common semantic features are unknown prior to examining the documents (e.g., a check in an exemplary non-limiting embodiment).

In a first exemplary aspect of the present invention, a method (and system) for discovering a significant subset in a collection of documents, includes identifying a set of documents from a plurality of documents based on a likelihood that documents in the set of documents carries an instance of information that is characteristic to the documents in the set of documents.

In a second exemplary aspect of the present invention, a system of discovering a significant subset in a collection of documents, includes an identification unit that identifies a set of documents from a plurality of documents based on a likelihood that documents in the set of documents carries an instance of information that is characteristic to the documents in the set of documents.

In a third exemplary aspect of the present invention, a system of discovering a significant subset in a collection of documents, includes means for recognizing indicia in a plurality of documents, and means, coupled to the recognizing means, for identifying a set of documents from a plurality of documents based on a likelihood that documents in the set of documents carries an instance of information that is characteristic to the documents in the set of documents.

In a fourth exemplary aspect of the present invention, a signal-bearing medium tangibly embodies a program of machine readable instructions executable by a digital processing apparatus to perform a method for discovering a significant subset in a collection of documents, where the method includes identifying a set of documents from a plurality of documents based on a likelihood that documents in the set of documents carries an instance of information that is characteristic to the documents in the set of documents.

In a fifth exemplary aspect of the present invention, a method for deploying computing infrastructure, includes integrating computer-readable code into a computing system, wherein the computer readable code in combination with the computing system is capable of performing a method for discovering a significant subset in a collection of documents, including identifying a set of documents from a plurality of documents based on a likelihood that documents in the set of documents carries an instance of information that is characteristic to the documents in the set of documents.

The exemplary method (and system) of the present invention enables the isolation within a large set of documents the group that most likely has importance where the specific significant patterns, in the sense of the semantic content, cannot be predetermined. This invention teaches how one can learn the location of the largest subsets and/or one or more significant subsets within a collection of documents where the distinguishing characteristic is a part of the semantic content of the document.

Such learning is accomplished by a variety of methods that determine the likelihood that an encountered pattern is a common semantic match to other encountered patterns by methods that include a combination of one or more of the methods disclosed below.

The exemplary method (and system) of the present invention recognizes and extracts handwritten (as well as stamped or printed) information on documents. The exemplary method of the present invention may be used to extract information from any type of document, including, but not limited to, original paper documents, photographic representations of documents, digital representations of documents, or a combination of original documents and representations of documents.

Checks are an example of documents that are handled in massive quantities by some parties. Hence, in an exemplary embodiment, the present invention is directed to extracting information from checks. It should be clear, however, that the present invention is not limited in its scope to these financial instruments, and the invention can be used as well for other forms of documents and contracts that carry handwritten information, or prints of quality too poor to be exactly readable.

In respect to the present description of the inventive method and system, "discovering significant subsets" is defined as isolating, from a large (e.g., in the range of millions of checks per day) set of documents, a group (e.g., subset) of documents that present the highest likelihood of containing similar features in contexts where complete pattern recognition is considered to be too hard or too costly. Complete pattern recognition is too difficult to obtain because it is too difficult to recognize 100% of the checks in such a large body of checks (e.g., millions per day).

For example, a bank may receive a batch of 8,000 checks where 3,000 of the batch of checks are written to a specific payee. Every check written to the specific payee will includes at least one (in most cases a plurality of) characteristic or feature that is particular to the specific payee. This at least one characteristic, however, may not be known to the bank. The discovery method of the present invention identifies the particular features and isolates all of the 3,000 checks written out to the specific payee by determining a likelihood that each check contains the at least one particular feature.

An important principle of this invention is that even if reading information is difficult, either because it is handwritten by someone whose handwriting has not served as a training ground to a handwriting recognition algorithm (i.e., an unknown writer) or printed with poor quality, a bank may still recognize, out of a large set of checks, a subset of checks, which are the checks in the batch of checks most likely to carry matching features.

With the above and other unique and unobvious exemplary aspects of the present invention, it is possible to optimize the discovery of significant subsets of documents in a collection of documents, where the documents in the subsets of documents share common semantic features that are unknown prior to examining the documents, for various applications.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 11 illustrates an exemplary hardware/information handling system 1100 for incorporating the present invention therein;

FIG. 12 illustrates a signal-bearing medium 1200 (e.g., storage medium) for storing steps of a program of a method of the present invention; and FIGS. 13A and 13B depict an exemplary sequence of checks being analyzed by the method and system of the present invention.

DETAILED DESCRIPTION OF EXEMPLARY EMBODIMENTS OF THE INVENTION

Figure 1:
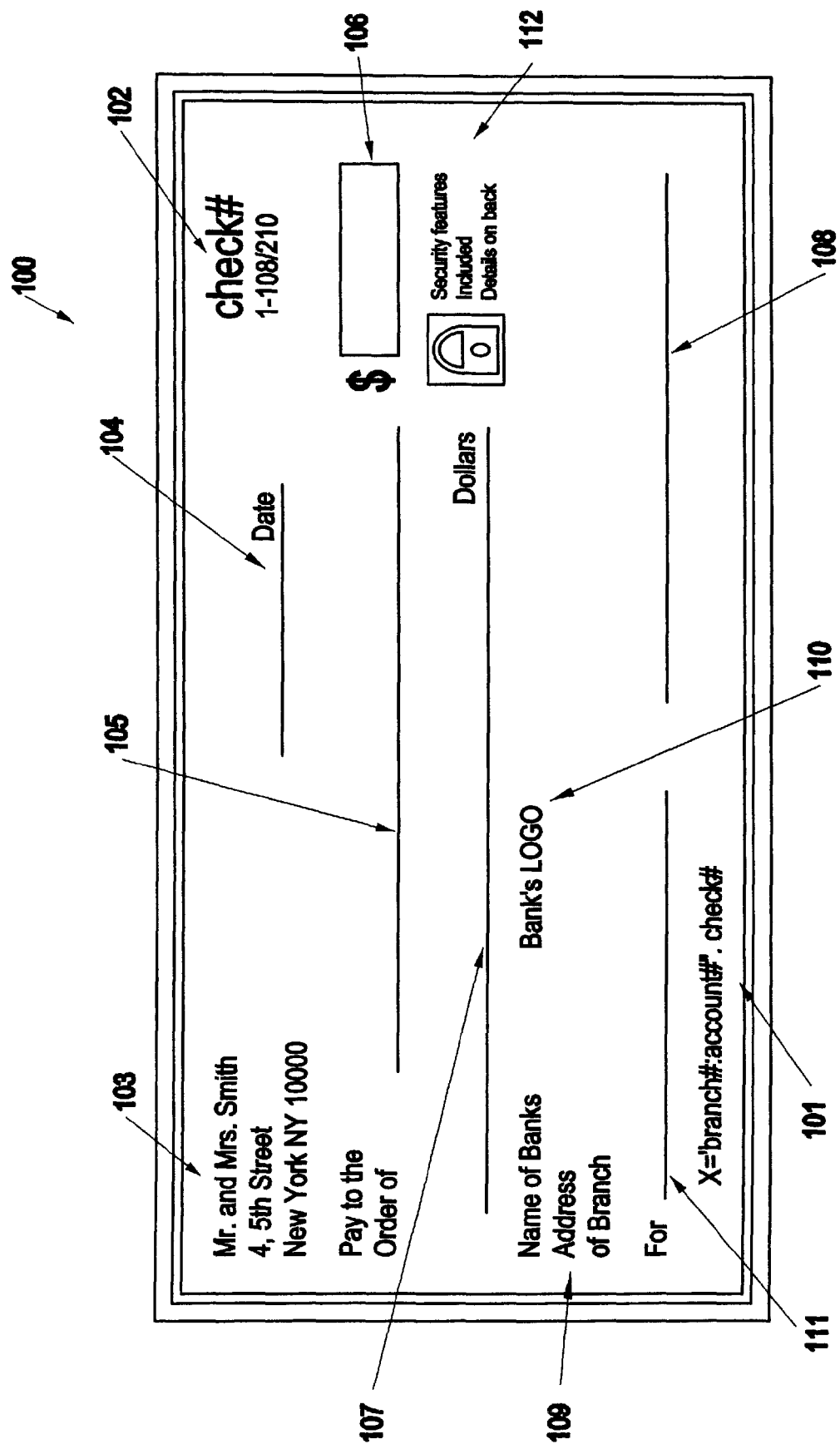
FIG. 1 illustrates a front view of an exemplary American check 100.
Figure 2:
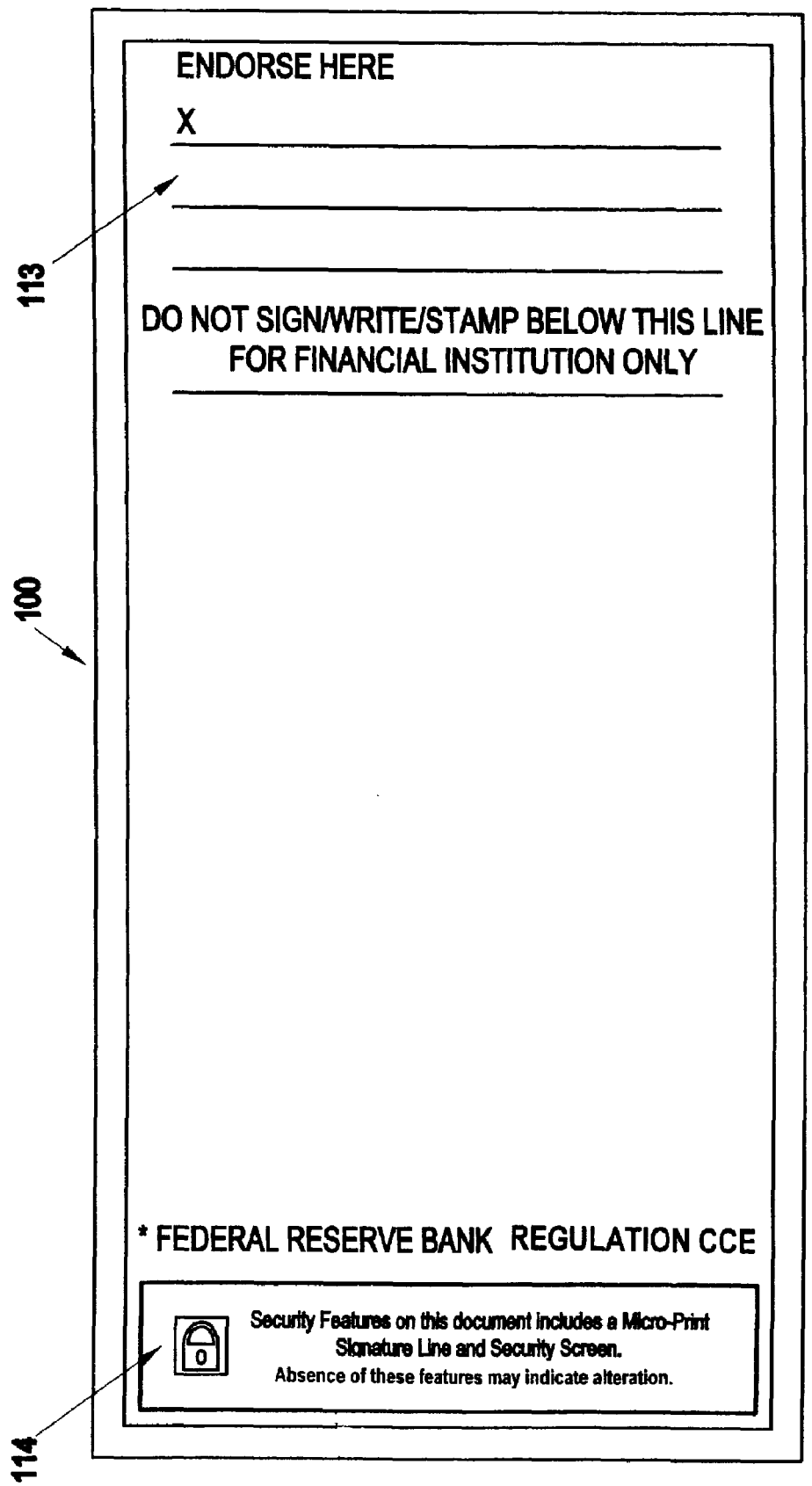
FIG. 2 illustrates a rear view of the exemplary American check 100.

Referring now to the drawings, and more particularly to FIGS. 3-13B, there are shown exemplary embodiments of the method and structures according to the present invention.

As mentioned above, the method and system for discovering significant subsets in a collection of documents of the present invention is exemplarily described below in the context of checks, where handwriting is a typical example of a human readable source and the checks are an example of documents from which information is automatically extracted. However, the method and system of the present invention may be applied to any human readable source and any document carrying such human readable source. For purposes of the present invention, the term "check" is specifically directed to personal checks. However, it may also include traveler's checks, bank checks, certified checks, money orders, coupons, remittance documents, receipts, business checks, tickets, currency, etc.

Figure 3:
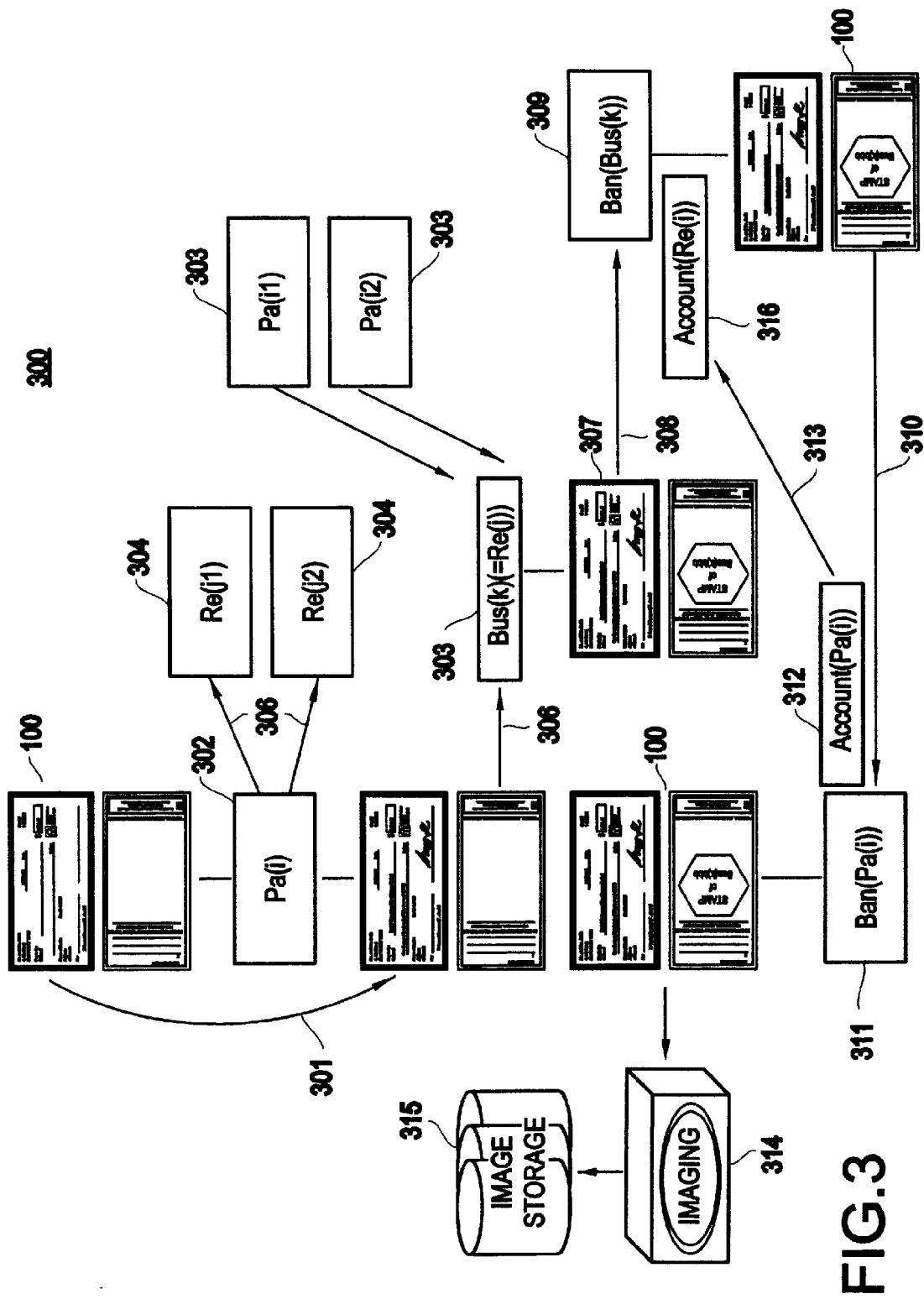
FIG. 3 illustrates an exemplary flow chart depicting the path of the check 100 through a typical bank check processing procedure 300.

FIG. 3 depicts a typical path of a check 100 after it is written and used as payment by a payer. The payer (Pa(i)) 302 writes the check 100 by filling in the date, the amount and the payee information 301.

Once the check 100 is written and signed, the payer 302 gives the check to a recipient (Re(j)) 306. The recipient may include one of an individual recipient 304 (Re(j1) or Re(j2)) or a business recipient 303 (Re(j)/Bus(k)). In the case of the business recipient 303, several payers Pa(i1), Pa(i2) 305 may be sending payments to the recipient 303.

The recipient 303, 304 endorses or stamps 307 the back of the check 100 and deposits (308) the check at its bank 309 (Ban(Bus(k))). As stated above, in the case of a business recipient 303, the recipient may be depositing checks into one or more accounts located in one or more banks. The recipient's bank 309 transfers (310) the check 100 to the payer's bank 311 (Ban(Pa(i))) against payment, i.e., money transferred from the account of the payer 302 at the payer's bank 311 to the account of the recipient 303, 304 at the recipient's bank 309.

Once the payer's bank 311 receives the check 100 from the recipient's bank 309, the payer's bank 311 checks the payer's account 312 for sufficient funds and then transfers the amount of the payment (313) from the payer's account 312 to the payee's account 316. The payer's bank 311 then processes the check 100 using an image processing procedure 314 to extract information from the returned check 100 and stores the extracted information in an image storage database 315.

Certain exemplary embodiments of the present invention are directed to handwriting. However, other embodiments of the invention are directed to the fact that printed text, and in particular printed text with known characters, and with known characters and known printing devices, is considerably easier than handwriting recognition. It should be clear to anybody versed in the arts of machine learning that the present invention, which is directed to discovering and isolating subsets of documents most likely to contain matching features in contexts where complete pattern recognition is considered to be too costly or too hard, can be used as well for handwriting recognition or other types of pattern recognition. Other types of pattern recognition include speech recognition, speaker identification and other biometrics measurements, etc.

The method (and system) of the present invention allows a bank to discover a significant subset, which includes a plurality of checks, written to a certain payee. That is, the method of the present invention discovers significant sequences (e.g., batches) of checks in a large string of checks that are returned to the bank. A typical bank may receive and process between 800,000 to one million checks per day. Approximately 85% of the processed checks are received in batches of 5 or less checks. For purposes of the present invention, "significant" could mean any batch of checks having 10 or more checks. Certain significant batches of checks, however, may include in the range of 10,000 checks.

However, such a meaning may change depending upon what is the particular application of the invention. The method of the present invention functions with the knowledge that checks from a particular payee are returned to the bank in batches. Therefore, the batches of checks exist as sequences in the overall collection (i.e., string, sequence) of customer checks.

That is, certain exemplary embodiments of the present invention provide a method (and system) for identifying and isolating large (e.g., significant) batches of checks written to a particular payee, where the bank does not have previous knowledge of the payee. Exemplary embodiments of the invention use a variety of techniques for generating a profile of a check, and then compare other checks in a sequence of checks to determine the likelihood that the checks share common semantic features.

Figure 4:
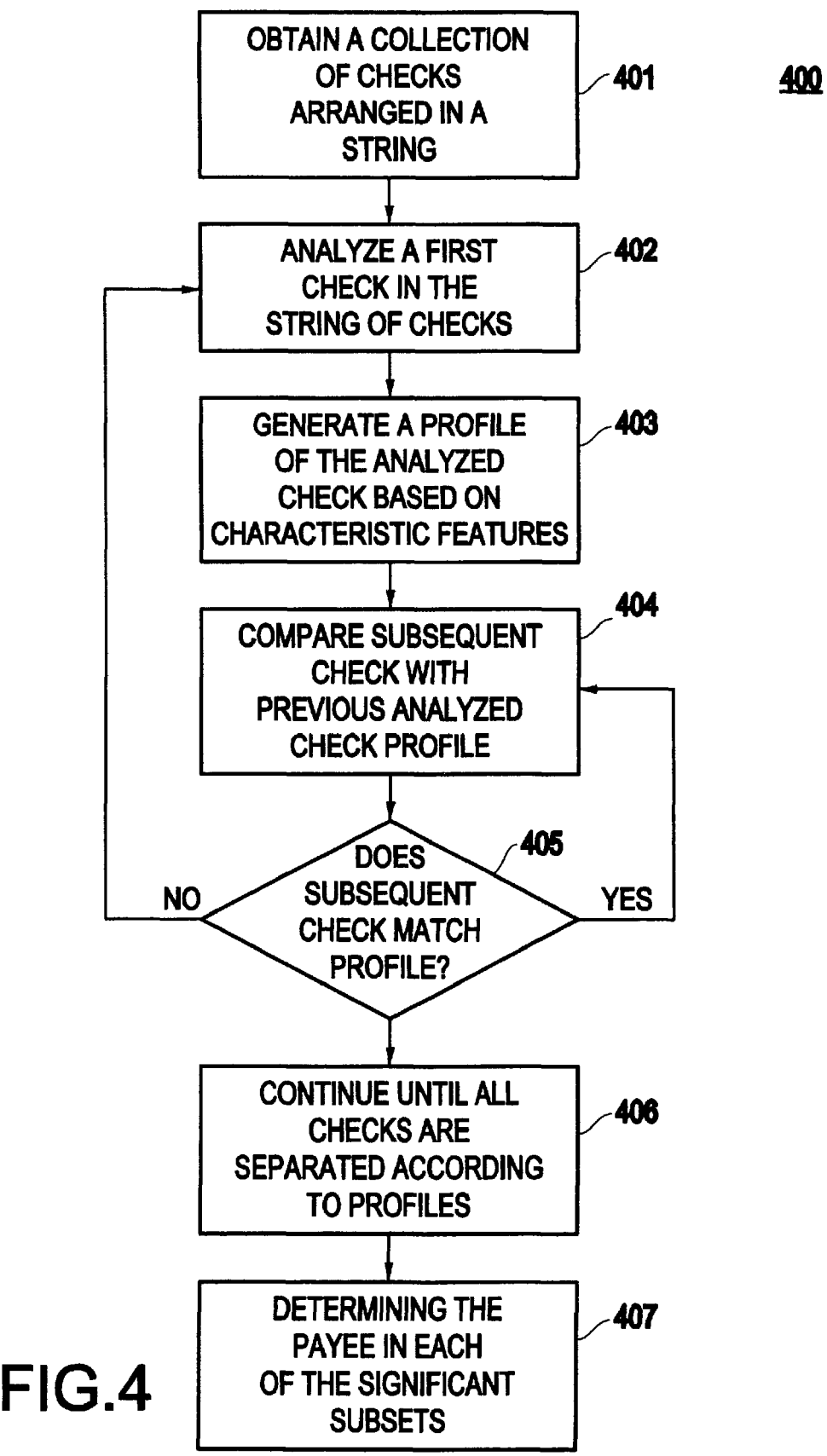
FIG. 4 illustrates an exemplary flow chart of a method 400 for discovering significant subsets in a collection of documents according to an exemplary embodiment of the present invention.

FIG. 4 illustrates an exemplary method 400 for discovering significant subsets in a collection of documents according to a certain aspect of the present invention. The method 400 includes obtaining a collection of checks written by customers of the bank (step 401). As indicated above, the checks in the collection of checks are typically arranged in sequence (i.e., in a string), and include sequences (i.e., batches) of checks written to certain payees.

A first check in the collection of checks is analyzed to determine characteristic features of the check (step 402). The features of the check include, for example, the amount that the check is written for (fields 106 and 107), the MICR line 101, the name of the payee (field 106), etc. The front of the check and the back of the check are analyzed to determine features of the check 100.

Once the characteristic features of the check are determined (step 402), a profile of the check is generated based on the characteristic features (step 403). A variety of techniques may be used to generate the profile of the check. The variety of techniques may include analyzing different features of the check. For example, the features of a stamp on the back of a check may be analyzed, such as the dimensions, placement, position, color, etc. of the stamp.

Next, the method 400 determines which checks, if any, in the collection of checks match the generated profile. FIGS. 13A and 13B depict a collection of N checks, which are arranged in sequence (e.g., in the order in which the bank received the checks) in a string of checks 1300. Check 1 1301 is analyzed and the profile is generated based on the characteristic features of check 1 1301 (steps 402 and 403). The subsequent checks in the string of checks 1300 are compared to the generated profile to determine if they match the profile (step 404).

A moving (e.g., sliding) window 1306 is positioned around the checks being compared. In FIG. 13A, check 2 1302 is compared to the profile of check 1 1301. If the features of check 2 1302 match the profile of check 1 1301, then the moving window slides along the string of checks 1300, as shown in FIG. 13B, and the next check, check 3 1303, is compared to the previous check, check 2 1302 (step 405) as well as check 1 1301.

A subsequent check may be compared to any number of previous checks. It is desirable to compare a subsequent check (e.g., 1303) to more than just one directly adjacent check (e.g., 1302) to improve the likelihood that the checks belong together in the same subset. However, due to the large number of checks, it is not practical or efficient to compare each subsequent check with every previous check.

As indicated above, when the checks are compared to the generated profile (step 404), a variety of fields on the check may be used for purposes of comparing the checks and the profile. Although it may be possible to consider every field of a check during the comparison, it may not be practical or efficient. Therefore, the variety of fields considered is predetermined based on the likelihood that these fields include characteristic semantic features that are similar to all checks included in a particular subset.

Then, the variety of fields are each assigned a variable weight so that a field having a weight is treated with increased consideration over a field having a lower weight. For purposes of the claimed invention, "variable" is defined as the ability to redistribute the weight assigned to each field during the analysis of the sequence of checks. That is, as the checks are being analyzed, if it becomes apparent that one of the fields is consistently more reliable than other fields on the checks, the amount of weight assigned to that field may be increased.

This process is continued until the features of one of the checks in the string of checks 1300 do not match the generated profile. As stated above, it is known that checks are returned to the bank in batches, therefore, when a check in the string of total checks 1300 does not match the generated profile, it signifies an end to the particular batch of checks. At this time, the batch of checks that did match the generated profile are isolated from the string of checks 1300 and kept in a separate, temporary pile.

The check that did not match the originally generated profile is then analyzed to determine its characteristic features. A new profile is generated based on the characteristic features of this check. Subsequent checks in the string of checks 1300 are compared to the new profile to determine if the features of the subsequent checks match this profile, using the same, previously disclosed process.

This process is continued until all of the N checks in the string of checks 1300 are separated into piles of checks having a likelihood of sharing characteristic features (step 406).

It is possible that separate batches of checks including the same characteristic features may have been returned to the bank at different times. Therefore, more than one pile of isolated checks may include the same characteristic features. Therefore, once the checks are completely separated into piles, the profiles of each of the piles are compared to determine if any of the piles of checks should be included in the same batch. This process may be done manually by visually inspecting each of the isolated piles. Alternatively, the piles may be compared automatically or semi-automatically by comparing one representative check (or several representative checks) from each pile using the profile method described above. During this process the full set of features of each check may be used to compare the checks from each pile.

The method 400 described above, specifically step 401 through step 406 is done automatically and does not require human inspection or analysis of the checks.

Once the piles of isolated checks are compared, the non-significant checks are removed. For purposes of the present invention, "non-significant" checks refer to checks not included in a large batch of checks sharing the same characteristic features. For example, non-significant checks include single checks or a small number of checks (e.g., 5 or less checks) written to a certain payee. Again a significant subset of checks refers to a subset of checks including a large (e.g., 10 or more checks) number of checks having the same characteristic features, for example, a large number of checks written to the same payee.

Next, the payee is determined for each of the significant subsets of checks (step 407). The payee is not determined automatically. In contrast, the payee is determined by manual (e.g., human visual) inspection of the checks in the significant subset of checks. Therefore, the method 400 of the present invention is a semi-automatic process because the final inspection of the checks may be done manually.

The following exemplary embodiments of the present will be described as applied to bank checks and the payee field is exemplarily used as the primary source of semantic information based upon which the subsets are distinguished.

Example I

Case in which Information about the Payers is not Utilized in Determining Likely Payee Candidates Example I is directed to a situation in which there is a large set of checks with undetermined payees. This example provides the means of deriving one or more payees names that are common to a substantial and/or significant subset of the large set (e.g., the total sequence). Example I addresses, for example the situation in which a bank wants to discover the most common names that its customer's checks are written to, when there is no account information about the payers accessible. The exemplary method of the present invention, as applied to Example I, operates with the knowledge that checks written to a specific payee may be found in batches within the total collection of checks, and that the batches of checks are discoverable.

Figure 5:
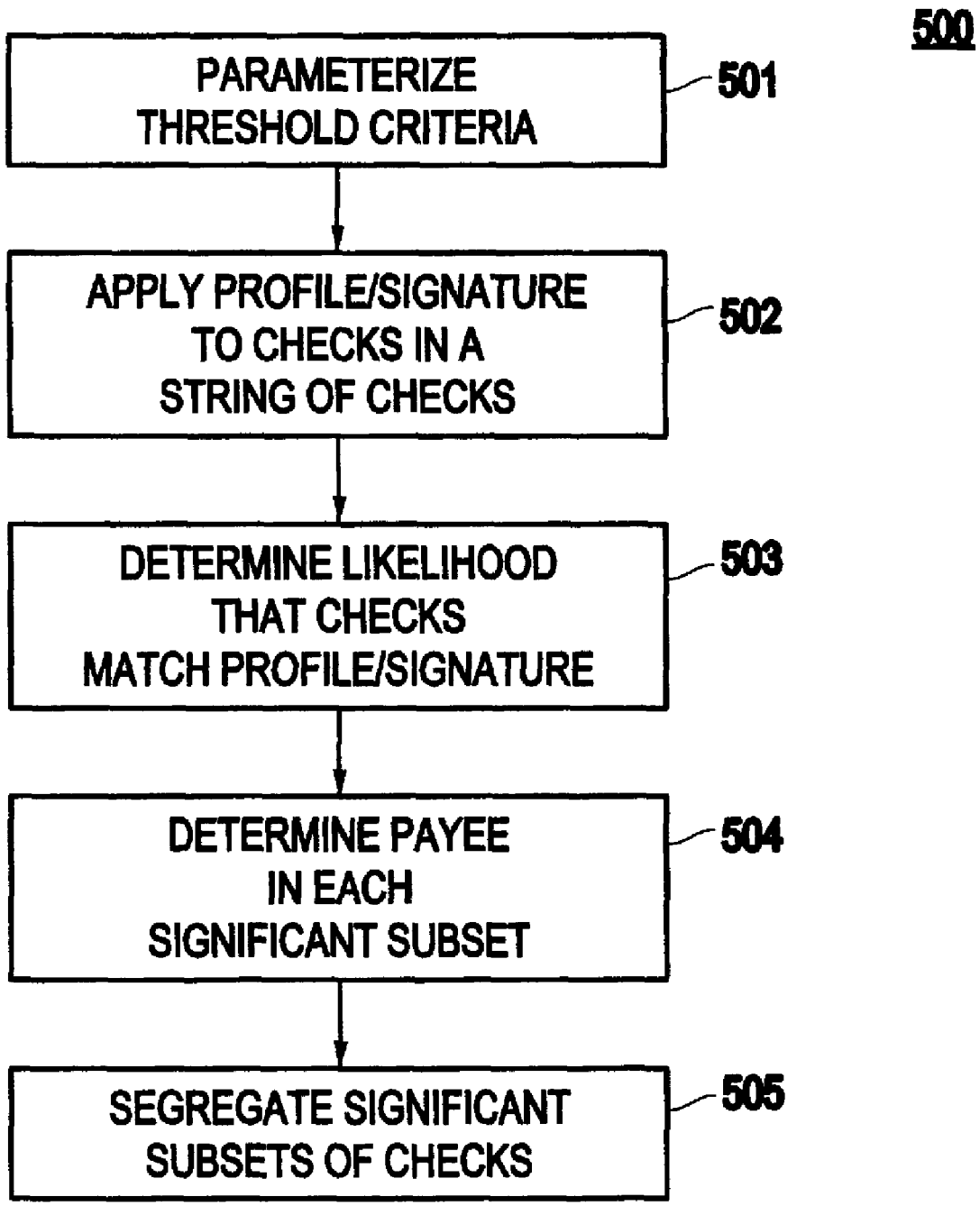
FIG. 5 illustrates an exemplary flow chart of a method 500 for discovering significant subsets in a collection of documents wherein information about the payer is not utilized according to an exemplary embodiment of the present invention.

FIG. 5 illustrates a method 500 for discovering significant subsets in a collection of checks according to an exemplary aspect of the present invention.

The method 500 includes first parameterizing the threshold criteria (step 501). That is, the threshold criteria (e.g., the number of checks, the amount range, etc.) that need to be the same to be considered significant or candidates for testing significance is parameterized. The threshold criteria is parameterized based on each specific application.

Next a profile metric is applied to each check in sequence based on image characteristics of fields on the front and back of the checks (step 502).

It may be known and of interest that, for example, electric utility bills are paid at a specific time of the month, they are generally within a narrow range in their amount, generally have variety in the cents amount, and are cleared by a small number of banks. This information may be used in defining the score.

Features used for the "score/profile" vector may include recognition results for chosen fields, recognition results for text lines in arbitrary locations (i.e. recognition of account number, which may appear in an arbitrary location on the check), geometrical features (e.g. shape of endorsement stamps), electronic auxiliary information (e.g. amount), etc.

Based on a combination of the above exemplary features, metrics defining distance between two checks are defined. For purposes of the present invention, the metric refers to a "likeness value" of the compared checks. Such distance may be either linear or nonlinear (e.g. presence of a similar feature may have greater importance than divergence in another feature). The larger the distance between the two checks, generally the less likely that the checks include matching features.

Once a distance measure is defined one can proceed to search for groups of similar objects. For that purpose one can apply one of any well known clustering techniques. The notion that the distance between the checks is based on the distances between the fields is the basis for a class of score/profile that can be applied. Fields may include a number of subfields of varying importance, for example, the first letter of the payee field may be taken as an important subfield to be weighted separately.

The degree to which two items are deemed to be close in their characteristics is defined as their "likeness". The means of measuring likeness may weight the relative importance of fields or their cross correlation in a variety of ways. For example, two items can be deemed to have strong likeness if they match strongly on one significant field even if they have a very low matching measure in other fields.

The score/profile metric is multi-dimensional and based on the analysis of features, which correlate with the contents of the payee field. This may include a consistent set of endorsements on the back of the check, a range of payment values, synonyms for the payee, etc. The variation in the measured values between adjacent items and within a sliding window are used to determine if, based on the metric, there is a high likelihood that the payees are the same in a sequence (e.g., a number of checks in succession in a total string of checks) of checks (step 503).

Figure 6A:
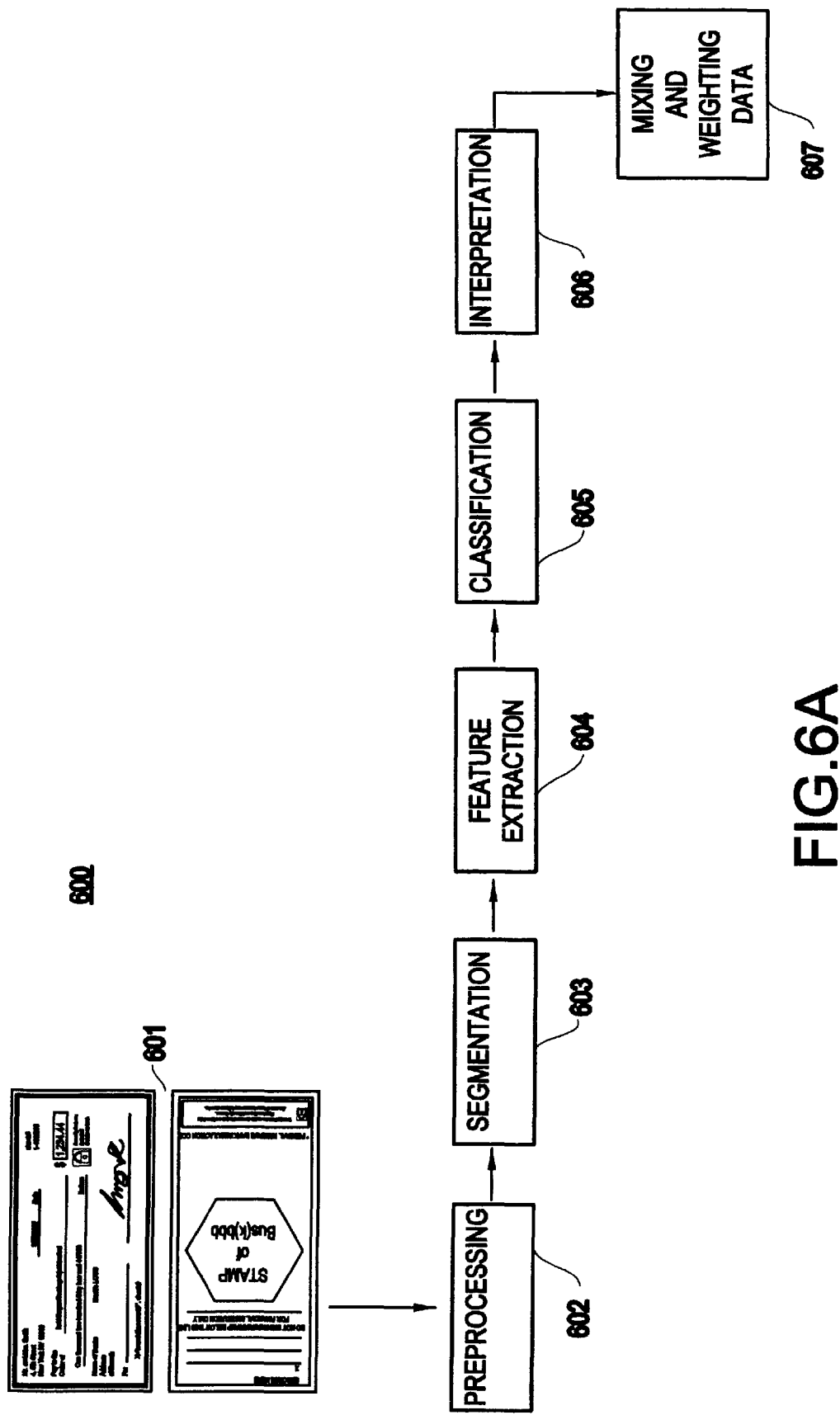
FIG. 6A illustrates an exemplary flow chart of a method 600 for extracting information from documents by document segregation according to an exemplary embodiment of the present invention.
Figure 6B:
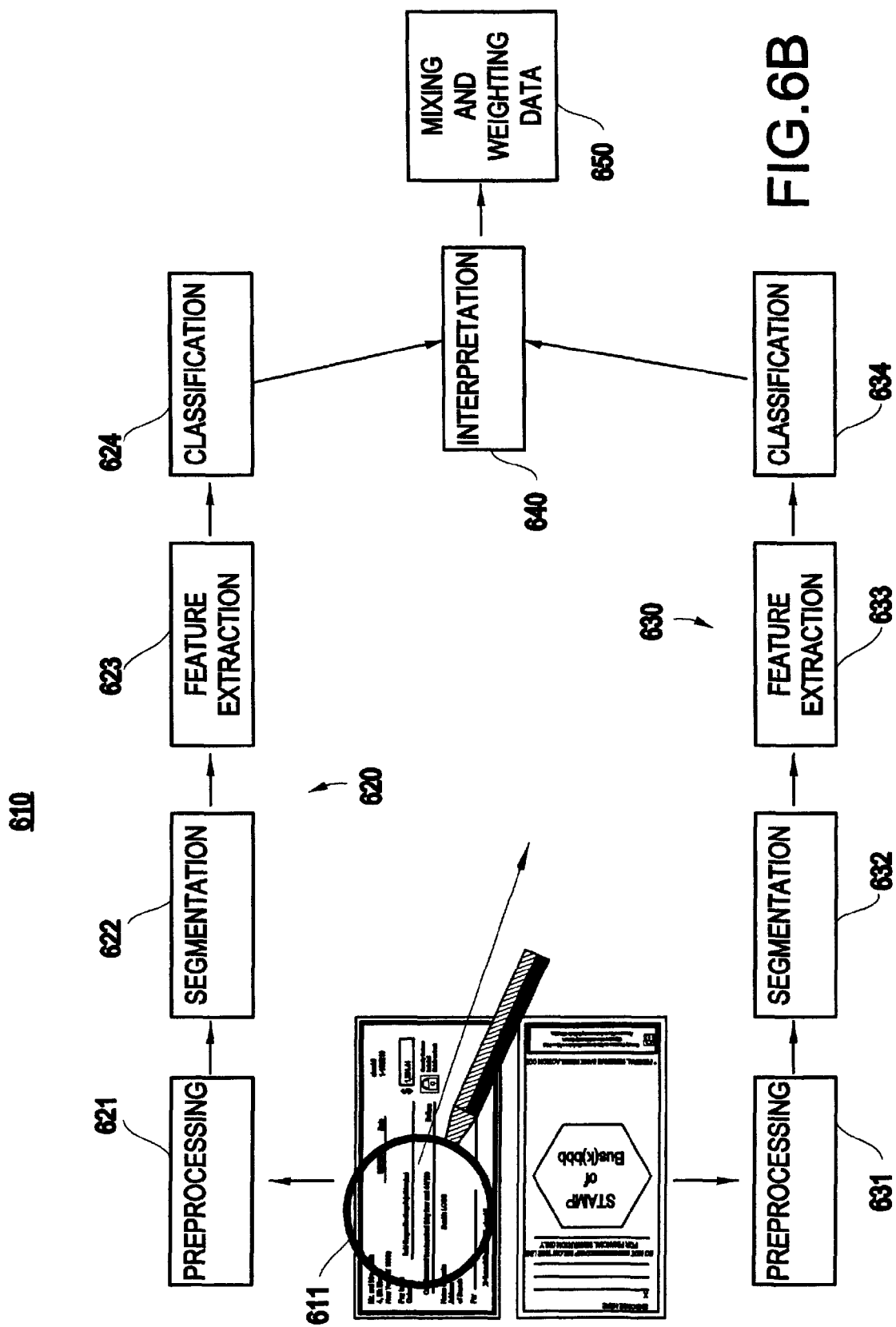
FIG. 6B illustrates an exemplary flow chart of a method 610 for extracting information from documents by document segregation according to another exemplary embodiment of the present invention.

When sequences of checks of sufficient size or importance are identified, then automatic and/or semi-automatic techniques are used to identify the payee (step 504), such as character recognition. Additionally, the payee may be identified manually by human-visual inspection of the checks. The results of the payee identification (step 504) can be fed to a separate process to segregate the significant subsets (step 505). The segregation process 600 (and 610) is depicted in FIGS. 6A and 6B.

There are several steps involved in the document segregation method of the present invention. The steps of the present invention will be described in the particular context of handwriting recognition for extracting handwritten information from a check 601. FIG. 6A depicts an exemplary method 600 of the present invention. The method 600 includes preprocessing 602, segmentation 603, feature extraction 604, classification 605, and interpretation 606.

In preprocessing 602, the check 601 is scanned and the scanned image of the check 600 is then altered. Altering the scanned image may include geometrical transformations such as rotation correction, filtering the check image to eliminate noise, background separation and elimination, etc.

Segmentation 603 may include geometrical analysis to identify the various fields of interest of the scanned checks 601. Each check written to a certain payee will include various characteristics specific to that payee. For example, each check written to a specific payee will include the payee's name written on the front of the check 600, as well as the payee's endorsement signature or a specific stamp on the back of the check 600. Additionally, checks written to the same payee may also include a specific message written in the memo line (see FIG. 1, 111) of the check 600 that is consistent with other checks written to the same payee. These features or fields are considered to be the features or fields of interest. Segmentation 603 analyzes the checks to identify these fields in each of the scanned checks.

The feature extraction 604 isolates the relevant properties or patterns of the predetermined objects to be recognized on the check.

The classification 605 determines which checks should be included in the set of checks most likely to have a specific information feature. The classification 605 determines if some characters or words on the check belong to a certain class of checks.

The interpretation 606, using the context of the search, attaches the characters and words to the element of the text.

The segregation method 600 obtains information and characteristics from each of the previously described steps. The information is then mixed and the weight applied to each characteristic is then adjusted (step 607).

FIG. 6B illustrates another exemplary embodiment of the method for document segregation 610 according to the present invention. The method described in FIG. 6A includes a single, serial chain of steps.

That is, the method included only a single iteration of preprocessing 602, segmentation 603, feature extraction 604, classification 605, and interpretation 606. In the embodiment depicted in FIG. 6B, however, the segregation method 610 includes two separate process chains 620, 630. Using a plurality of process chains is advantageous for improving accuracy.

The segregation method 610, however, is not limited to using either one or two chains, and a plurality of chains, including any suitable number of chains, may be used in parallel in order to extract different features from the checks. For instance, it is useful to use multiple classifiers that may utilize different features, as in one simple case when both character and word classifiers are used and the interpretation uses confrontation of both classifications. This specific case is illustrated in FIG. 6B.

The segregation method 610 includes a character recognition chain 620 and a word recognition chain 630. The character recognition chain 620 extracts information regarding specific characters (e.g., letters in a word) that appear on the check 611, while the word recognition chain 630 extracts information regarding specific words that appear on the check 611. It is advantageous to use multiple chains to gain more information and to increase the accuracy of the results obtained by the segregation method 610.

The segregation method, however, is not limited to only one chain or two chains as provided in FIGS. 6A and 6B, but may include a plurality of chains. In addition to word recognition 630 and character recognition 620, the segregation method 610 may also include, for example, geometrical analysis of images on the check. The images on the check may include stamps on the back of the check, printed information, etc.

The character recognition chain 620 includes preprocessing 621, segmentation 622, feature extraction 623 and classification 626 as described above regarding FIG. 6A. The word recognition chain 630 also includes preprocessing 631, segmentation 632, feature extraction 633 and classification 636. During the method 610, all pertinent fields on the check are simultaneously examined for preset patterns or information, as opposed to only analyzing a single check field at a time.

The segregation method 610 of the present invention obtains information from each step in the method. Once the information is obtained from each step from each of the character recognition chain 620 and the word recognition chain 630, all of the information is combined and subjected to interpretation 640.

The segregation process 600/610 provides a refined view of the size and significance of the subsets of checks. As indicated above, multiple significant sequences may be from a common payee. This may be addressed by comparing the weighted score for each detected sequence. Human visual inspection of selected items may be an integral part of the described process. For instance, as described above, once the significant subsets are discovered and separated from the total collection of checks, the payee for each significant subset of checks may be determined through human visual inspection.

Example II

Case in which Information about the Payers in General is Utilized in Determining Likely Candidates The following example is directed to a situation in which a bank has information about payers such as the payers' history of payments and/or images of the payers' checks. For example, this could be the case where the payers are existing customers or former customers of the bank, and access to the customer records is possible. Additionally, in the present example, the check registry does not include payee information, and there is no source of payee information in machine-encoded form.

Figure 7:
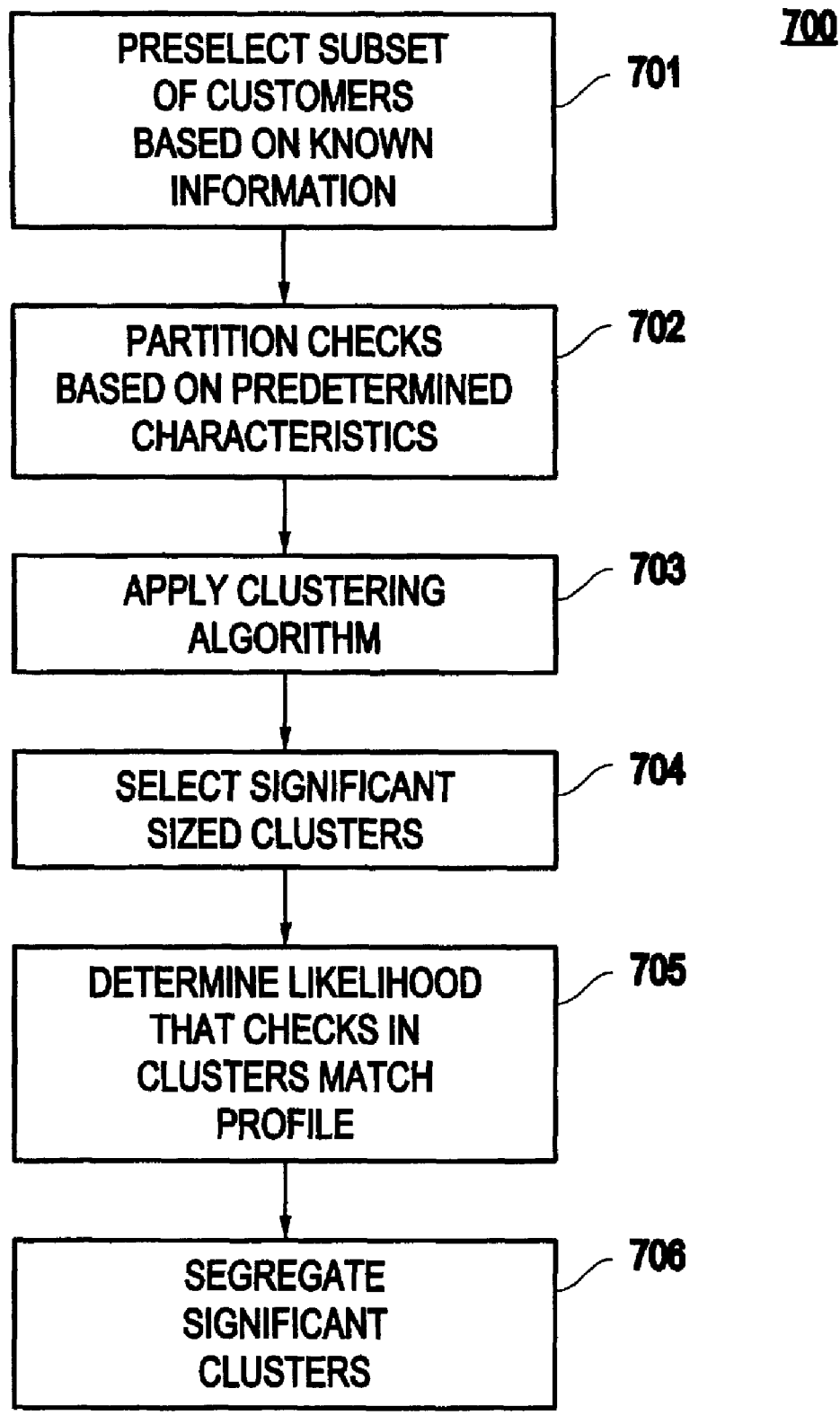
FIG. 7 illustrates an exemplary flow chart of a method 700 for discovering significant subsets in a collection of documents wherein information about the payer is utilized according to an exemplary embodiment of the present invention.

FIG. 7 depicts an exemplary method 700 for discovering significant subsets in a collection of documents wherein information about the payer is utilized, according to an exemplary aspect of the present invention.

The method 700 includes first preselecting a subset of customers based on known information (step 701). The method 700 is not limited to a specific technique for preselecting the subset of customers and may include selecting the subset of customers according to a check list (e.g., a check register—a list of the checks written by a single entity or individual with the amount and date) for a subset of customers, selecting the customers based on demographic and/or geographic information (zip code from address field) for a known or assumed population (e.g., most frequently used credit cards, local utility companies, etc.), and selecting a subset of customers by examining all of the transactions that are in electronic encoded form (e.g., existing on-line accounts).

Once the subset of customers is selected, the checks are partitioned (step 702) by characteristics (e.g., amount, frequency, etc.) that may characterize common use (e.g., credit card payments, utility bills, mortgage, etc.). For each of the partitions, images of the checks are retrieved and a clustering algorithm is applied (step 703). Any known clustering algorithm may be used. From clusters of significant size, (e.g., 10 or more checks) candidates (e.g., samples from a pile) are selected (step 704). By automatic, semi-automatic or manual means, the sameness of checks is determined by comparing the features of the checks with a generated check profile (step 705). If there is sufficient commonality, then the common payee name is used to test the significance of the batch of checks. The significance of the checks is determined using the previously described segregation method (step 706).

Example III

Case in which the Subsets of Checks to be Discovered, Automatically or Semi-Automatically, are within those Written by a Specific Customer and there is Access to both a Check Registry and Check Images The following example is directed to a situation in which the entire sequence of checks and the subsets of checks being sought are created by a single entity or individual and efficient means are needed to find significant subsets in the sequence.

Figure 8:
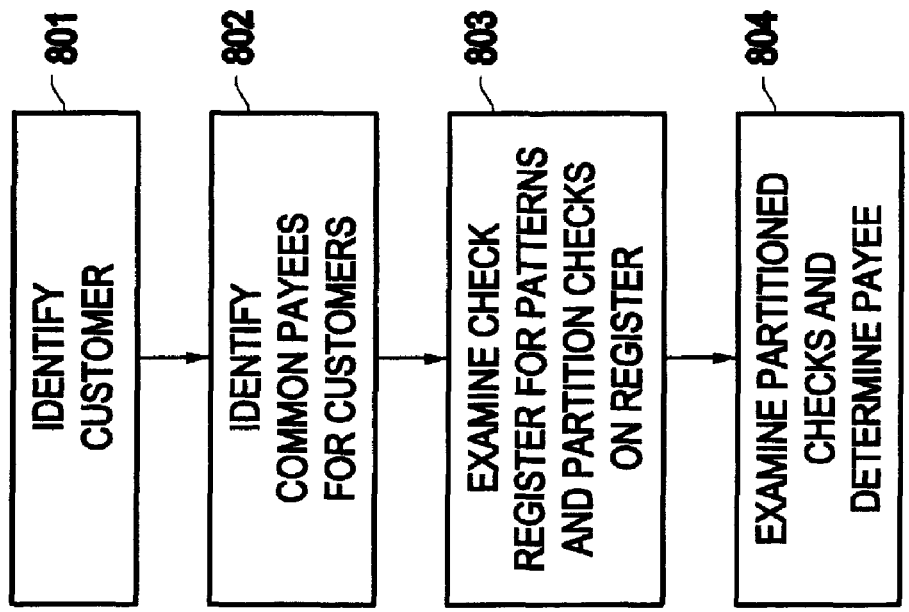
FIG. 8 illustrates an exemplary flow chart of a method 800 for discovering significant subsets in a collection of documents wherein there is access to the document registry and document images according to an exemplary embodiment of the present invention.

FIG. 8 depicts an exemplary method 800 for discovering significant subsets in a collection of checks in accordance with this exemplary aspect of the present invention.

The method 800 includes identifying a specific individual for which the bank would like to determine common and/or repetitive payees (step 801). The method 800 then identifies common payees for the specific customer by discovering what are the most common names to which the single source (entity or individual) writes checks (step 802).

The common payees are discovered by examining a check list (e.g., a check register) for the customer to identify patterns (e.g., similar amounts, repetitive payment time of month/year, etc.) and partition the checks in the sequence into subsets based on the identified patterns (step 803).

Check images for each partitioned subset of checks are retrieved and automatically or semi-automatically examined to determine the set of distinct payees (step 804).

Within the method 800 applied to checks of a single individual, learning characteristic (e.g., training) capable of handwriting recognition may be utilized. By correlating the amount of the check (which is encoded on the MICR line 101) with the text handwritten in the courtesy line 107, the handwriting recognition can be significantly improved.

Further, within the method 800 applied to checks of a single individual, to assist the learning characteristic (e.g., training) of the handwriting recognition capability, images of arbitrary checks written by the individual are studied to improve character recognition.

Even further within the method 800 applied to checks of a single individual, demographic and geographic information drawn from other information sources may be used to pre-select likely payees, as described above in Example II.

Additionally, within the method 800 applied to checks of a single individual, to assist in learning the characteristic of the individual's checks, consistent use of the memo field 111 to denote accounts or other useful information may be used.

Finally, within the method 800 applied to checks of a single individual, all or a large subset of the check images are examined using a score/profile, as previously described above in Example I. The images are clustered based on the score/profile. Representatives of dense clusters are used as candidates for repeating payees. These payees are sorted using other criteria cited above (e.g., amount of check, frequency, memo field, etc.) to determine the significance of the subsets of checks. Manual and semi-automatic verification may be used to determine the payee of the significant subsets of checks.

The method and system of discovering significant subsets of documents in a collection of documents of the present invention is a semi-automatic process. That is, the method of the present invention automatically generates a profile of a check (or other document) and determines which checks in a collection of checks match the generated profile. Once the significant subset of checks is automatically determined and segregated, the bank (or other document handler) must manually determine the significant feature or features that are characteristic to the documents included in the significant subset (e.g., the payee of the check).

Figure 9:
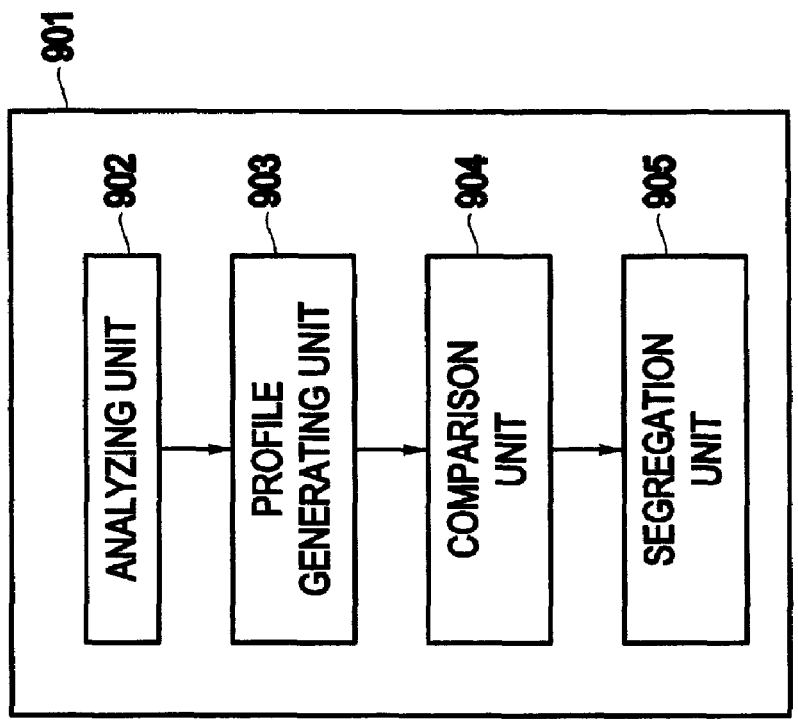
FIG. 9 illustrates an exemplary computer system 900 of discovering significant subsets in a collection of documents according to an exemplary embodiment of the present invention.

FIG. 9 depicts an exemplary computer system 900 of discovering significant subsets in a collection of documents according to an exemplary embodiment of the present invention. The computer system includes an identification unit 901 that identifies a set of documents from a plurality of documents based on a likelihood that documents in the set of documents carries an instance of information that is characteristic to the documents in the set of documents. The identification unit 901 may include at least an analyzing unit 902, a profile-generating unit 903, a comparison unit 904 and segregation unit 905.

The analyzing unit 902 scans an entire batch of received checks and arranges the checks in a sequence in order in which they were received by the bank. The analyzing unit 902 then analyzes the first check in the sequence to determine the features of the check.

The profile-generating unit 903 determines the characteristic features of the analyzed check. Based on the characteristic features, the profile-generating unit 903 creates a profile for the check. In the profile, the characteristic features of the check are each assigned a weight based on the reliability of each of features for representing the identifying characteristics of the check.

The comparison unit 904 determines whether a check in the sequence of checks belongs in a batch of checks that includes previous checks in the sequence. The comparison unit 904 compares the features of a check to the profile of previous checks in the sequence to determine if the features of the check match the profile. The comparison unit 904 provides a score (e.g., a degree of "sameness") for the check. If the features of the check match the profile of the previous checks, then the check is included in the batch of checks.

Figure 10:
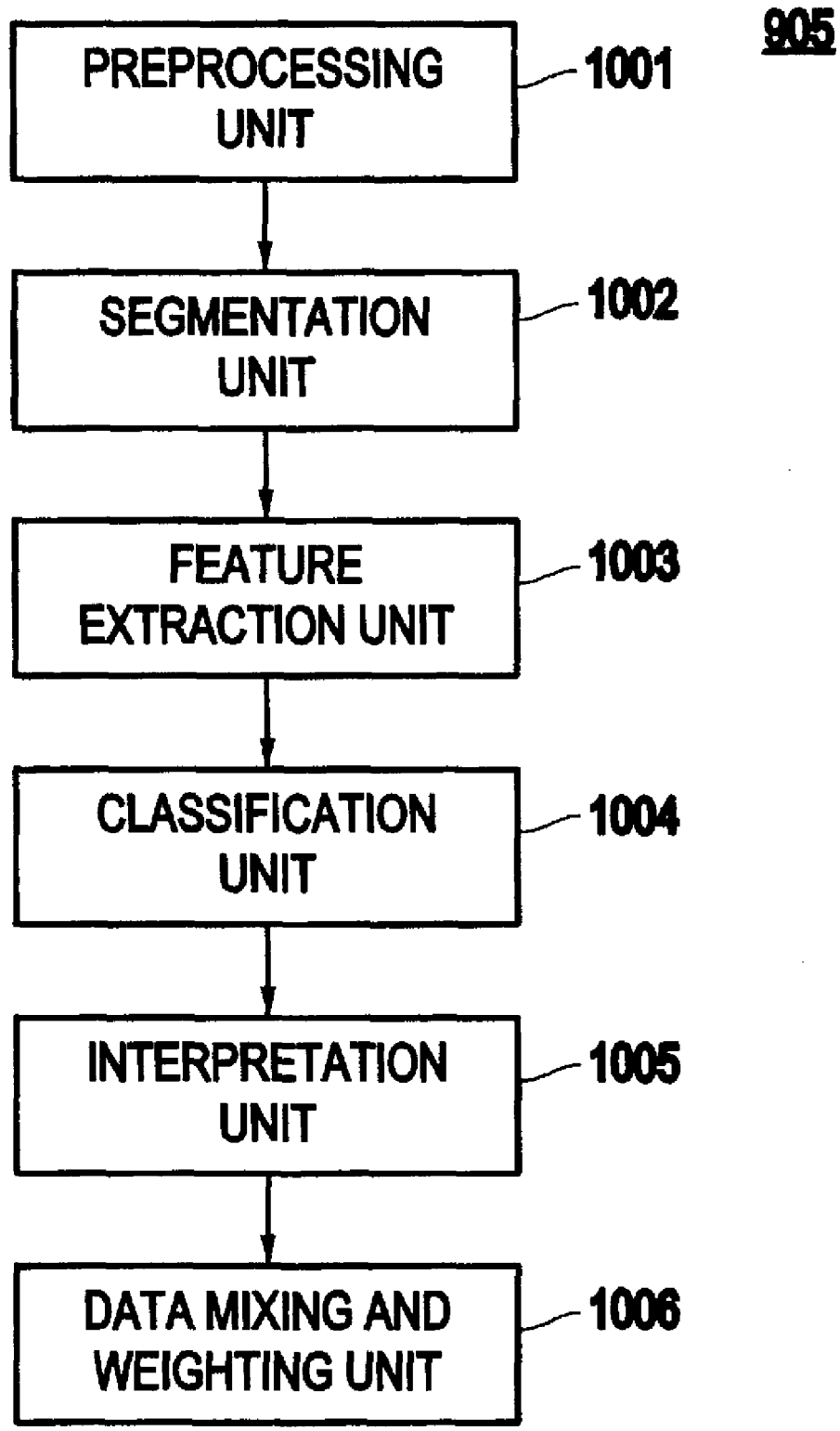
FIG. 10 illustrates an exemplary segregation unit 904 of the computer system 900 depicted in FIG. 9 that extracts information from documents by document segregation according to the present invention.

The segregation unit 905 extracts information from the checks to segregate which of the batches obtained from the comparison unit are significant. FIG. 10 depicts an exemplary segregation unit for extracting information from checks by check segregation, according to an exemplary embodiment of the present invention. The segregation unit 904 includes a preprocessing unit 1001, a segmentation unit 1002, a feature extraction unit 1003, a classification unit 1004, an interpretation unit 1005 and a data mixing and weighing unit 1006.

The preprocessing unit 1001 scans the check 100 and alters the scanned image of the check 100. Altering the scanned image may include geometrical transformations such as rotation correction, filtering the check to eliminate noise, background separation and elimination, etc.

The segmentation unit 1002 uses geometrical analysis to identify the various fields of interest of the checks.

The feature extraction unit 1003 isolates the relevant properties or patterns of the predetermined objects to be recognized on the check.

The classification unit 1004 determines which checks should be included in the set of checks most likely to have a specific information feature. The classification unit 1004 determines if some characters or words on the check belong to a certain class of checks.

The interpretation unit 1005, using the context of the particular search, attaches the characters and words to the element of the text.

The data mixing and weighing unit 1006, combines the data obtained from each of the above-described units with information known to the bank prior to the search. Once the information is combined, the data mixing and weighing unit 1006 adjusts the weight assigned to the information.

FIG. 11 shows a typical hardware configuration of an information handling/computer system in accordance with the invention that preferably has at least one processor or central processing unit (CPU) 1111. The CPUs 1111 are interconnected via a system bus 1112 to a random access memory (RAM) 1114, read-only memory (ROM) 1116, input/output adapter (I/O) 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface devices to the bus 1112), communication adapter 1134 (for connecting an information handling system to a data processing network, the Internet, an Intranet, a personal area network (PAN), etc.), and a display adapter 1138 for connecting the bus 1112 to a display device 1138 and/or printer 1139 (e.g., a digital printer or the like).

As shown in FIG. 11, in addition to the hardware and process environment described above, a different aspect of the invention includes a computer-implemented method of performing the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the present invention.

This signal-bearing media may include, for example, a RAM (not shown) contained with the CPU 1111, as represented by the fast-access storage, for example. Alternatively, the instructions may be contained in another signal-bearing media, such as a magnetic data storage diskette or CD-ROM disk 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), or other suitable signal-bearing media including transmission media such as digital and analog and communication links and wireless. In an illustrative embodiment of the invention, the machine-readable instructions may comprise software object code, compiled from a language such as "C", etc.

Additionally, it should also be evident to one of skill in the art, after taking the present application as a whole, that the instructions for the technique described herein can be downloaded through a network interface from a remote storage facility.

While the invention has been described in terms of several exemplary embodiments, those skilled in the art will recognize that the invention can be practiced with modification within the spirit and scope of the appended claims.

For example, the present invention may also be used in the context of a mailroom. Varying types of documents containing varying types of information from varying locations may be received into a mailroom. The present invention may be used to identify and isolate significant sets of those documents.

Additionally, the present invention may be used in the context of speech recognition of recorded conversations. That is, the method (and system) of the present invention may be used to distinguish the speech between several different participants in a conversation. The method may be used to identify the speech of each individual speaker and segregate the portions of the conversation spoken by a particular individual.

Further, it is noted that, Applicants' intent is to encompass equivalents of all claim elements, even if amended later during prosecution.

What is claimed is:

1. A method of discovering a subset in a collection of documents, the method being performed on a computer programmed to perform the method, the method comprising:
    obtaining a collection of documents, the documents being arranged in sequence and the subset arranged in sequence within the collection of documents;
    analyzing a first document in the collection of documents to determine characteristic features of the first document, a plurality of the characteristic features including human created indicia;
    generating a profile based on the characteristic features of the first document;
    assigning a variable weight to each of the characteristic features;
    comparing subsequent documents in the collection of documents to the profile to identify the subset, said comparing comprising considering the characteristic features based on the variable weight assigned to the characteristic features;
    during said comparing, redistributing the variable weight when it is determined that one or more of the characteristic features is more reliable than other characteristic fields; and
    preselecting a subset of users, said users having created at least one document in the collection of documents, said analyzing is conducted based on said preselecting a subset of users.

2. The method according to claim 1, further comprising:
    isolating, after said identifying, said subset of documents from the collection of documents.

3. The method according to claim 2, further comprising:
    determining, after said isolating, an identity of said information that is characteristic to the documents.

4. The method according to claim 1,
    wherein there is a likelihood that documents included in said subset carry at least one instance of information that is characteristic to said documents in said subset of documents.

5. The method according to claim 1, wherein said cluster of documents comprises a string of documents, said method further comprising determining a beginning and an end of said string of documents, and
    wherein said cluster of documents comprises documents other than those randomly spread through said plurality of documents.

6. The method according to claim 1, further comprising:
    parameterizing a threshold criteria that determines a significance of said subset of documents.

7. The method according to claim 1, wherein said characteristic feature comprises features selected from a variety of fields on a document.

8. The method according to claim 1, wherein the collection of documents comprises a collection of checks.

9. The method according to claim 1, wherein the human created indicia comprises handwritten features on the document.

10. The method according to claim 1, wherein the characteristic features are unknown prior to said analyzing.

11. The method according to claim 1, wherein the collection of documents comprises a collection of checks, and
    wherein the characteristic features identify a payee of the subset of documents in the collection of documents.

12. The method according to claim 1, wherein when said subsequent document matches said profile, said subsequent document is included in said set of documents and a next subsequent document is compared at least to said subsequent document.

13. The method according to claim 1, wherein when said subsequent document does not match said profile, said subsequent document is excluded from said set of documents and a new profile is generated for said subsequent document.

14. A system for discovering a significant subset in a collection of documents, comprising:
    an analyzing unit that determines characteristic features from a document in the collection of documents;
    a profile-generating unit that generates a profile for said document based on said characteristic features; and
    a comparison unit that compares a subsequent document with said profile,
    wherein when said subsequent document matches said profile, said subsequent document is included in said set of documents and a next subsequent document is compared at least to said subsequent document.

15. A method, comprising:
analyzing a first document in a collection of documents to determine a characteristic feature of the first document;
generating a profile of the first document based on the characteristic feature; and
comparing a subsequent document in the collection of documents to the profile,
wherein when the subsequent document matches the profile, the subsequent document is included in a set of documents and a next subsequent document is compared at least to the subsequent document.

16. The method according to claim 15, wherein when said subsequent document does not match said profile, said subsequent document is excluded from said set of documents and a new profile is generated for said subsequent document.

* * * * *